Patented Apr. 27, 1926.

1,582,053

UNITED STATES PATENT OFFICE.

PAUL KÖPPEL, OF KARLSRUHE, GERMANY.

PROCESS FOR TREATING VEGETABLE SUBSTANCES AND EXTRACTING THEREFROM FIBROUS SUBSTANCES.

No Drawing.   Application filed May 14, 1923.  Serial No. 639,023.

*To all whom it may concern:*

Be it known that PAUL KÖPPEL, a citizen of Germany, residing at Karlsruhe, Baden, Germany, has invented certain new and useful Improvements in Processes for Treating Vegetable Substances and Extracting Therefrom Fibrous Substances, of which the following is a specification.

The present invention relates to a process for extracting from raw vegetable matter of any description, such as flax, hemp, straw, peat and the like, those valuable products, more particularly fibres, which are suitable both for the manufacture of paper and for spinning with a view to the manufacture of textiles of all kinds.

The process consists in treating the raw vegetable matter with insoluble (or difficultly soluble) substances in powder form in the presence of a suitable liquid. There is thus produced an interaction (which has not yet been closely investigated) between the so called inter-cellular substance in which the elementary fibres of the raw material are embedded (incrusted), and the powdered substances which are hereinafter referred to as catalyzers or decomposing agents, whereby that part of the inter-cellular substance, the so called incrustations, which are not dissolved undergo a peculiar change visibly shown by the incrustations becoming for the most part brittle and friable. By reason of this changed condition the inter-cellular substances can be washed out from the fibrous material, or they can be combed out, so that the tiny fibrous strands are separated out and can be spun to make thread or treated for the making of paper. The process can be carried out in many different ways and with the most diverse catalyzers.

The following are given as examples of ways of carrying out the process:

*1st example.*—100 parts of flax tow, from which the woody constituents have been first removed, are mixed with 25 parts of finely powdered calcined magnesite (the oxide of an earth metal) and 1,000 parts of water are poured over the mixture. The whole mixture is then heated in an open vessel for four hours to 95° to 100° C., the product is then rinsed with water, dried and combed out.

*2nd example.*—300 parts of rye straw are heated with 75 parts of calcined magnesite and 3,500 parts of water for six hours to 120° C. The product is washed and ground and is then a usable substance for the manufacture of paper.

*3rd example.*—100 kg. of flax tow from which the wood has first been removed are heated together with 25 kg. of finely divided kieselguhr and 1,000 litres of water in an open cooker for four hours to 95° to 100° C., the product is washed, dried and combed in order to secure the fibrous material.

*4th example.*—300 kg. of flax straw are heated together with 75 kg. kaolin and 3,000 litres of water in an autoclave for six hours, and then the substance is subjected to the same treatment as described above in the 1st, 2nd, and 3rd examples.

*5th example.*—500 parts of flax tow from which the particles of wood have first been removed are heated together with 5 parts of calcined magnesite and 5,000 parts of a weak solution of caustic soda in an autoclave for two hours to 120° C. The product is washed, dried and combed in order to secure the fibrous material.

The decomposing agent or catalyzers having a nonalkaline, indifferent and insoluble nature, as mentioned in the several examples of the new process may be produced or combined in the most various ways; those substances are more especially advantageous as catalyzers, which are colloidal and adsorbent. In this connection the following may be mentioned by way of example as decomposing agencies:

Wood-, tar-, blood charcoal, absorbent or similar charcoal, bole, kaolin, clay and loam.

A change, and no doubt an increase in the action of the hereinbefore described general processes, particularly in certain difficultly decomposable species of plants, follows from the 5th example, where instead of water other steeping liquids can be employed that act upon the intercellular substance. Such liquids may be, for example:

Weak aqueous alkali lyes, solutions of alkali carbonates, solutions of neutral or acid sulphites, soaps or, for example, Turkey red oil, and the like.

One or other of these steeping liquids will be used dependent upon the nature of the raw material and of the catalyzer in question. It has furthermore to be observed that this new process may be carried out in the cold, (that is, under normal temperature conditions) or by the application of heat, at normal atmospheric pressure or under high pressure, and even in certain circumstances under partial vacuum, according to the kind of raw material, liquid and catalyzer.

A particular advantage of the new process must be acknowledged as residing in the fact that the catalyzers can be remarkably easily regenerated by heating, so that they can be made suitable for use over and over again; hence the new process is extraordinarily economical.

I am aware that it has already been proposed to use calcium hydroxide, strontium hydroxide and barium hydroxide as decomposing media for vegetable substances, it being understood that there is a chemical change and cross-action between the decomposing agents and the vegetables. For this reason I have expressly eliminated the above mentioned substances from the present invention.

For removing all doubt as to the scope of the invention I expressly state that I do not claim the process of deinking printed paper, but only the manufacture of paper and of fibrous material from raw vegetable substances.

I claim—

1. A process of manufacturing fibrous material which is suitable for spinning, and of paper from raw vegetable substances consisting in using a non-alkaline insoluble indifferent matter, in a finely divided state, mixing this matter with a liquid to form a suspension, boiling in this suspension the vegetable substance, drying the latter and combing out the fibrous material.

2. A process of manufacturing fibrous material which is suitable for spinning, and of paper from raw vegetable substances consisting in using a non-alkaline insoluble indifferent matter in a colloidal state, mixing this matter with water to form a suspension, boiling in this suspension the vegetable substances, drying the latter and combing out the fibrous material.

3. A process of manufacturing fibrous material which is suitable for spinning, and of paper from raw vegetable substances consisting in using a non-alkaline, insoluble indifferent matter in finely divided state, mixing this matter with a liquid to form a suspension, treating in this suspension the vegetable substances and drying the treated substances for further use.

4. A process of manufacturing fibrous material which is suitable for spinning, and of paper from raw vegetable substances consisting in using a non-alkaline, indifferent insoluble matter of adsorbent nature in a finely divided state, mixing this matter with a liquid to form a suspension, treating in this suspension the vegetable substances and drying the latter for further use.

In testimony whereof he has signed his name to this specification.

DIPL. ING. PAUL KÖPPEL.